US008261482B1

(12) United States Patent
Buchanan (10) Patent No.: US 8,261,482 B1
(45) Date of Patent: Sep. 11, 2012

(54) FISHING NET SYSTEM (76) Inventor: Melvin L. Buchanan, Forest Park, IL (US)

(*) Notice: Subject to any disclaimer, the term of this patent is extended or adjusted under 35 U.S.C. 154(b) by 161 days.

(21) Appl. No.: 12/909,476

(22) Filed: Oct. 21, 2010

(51) Int. Cl.
A01K 77/00 (2006.01)
(52) U.S. Cl. .................. 43/12; 43/11; 206/223; 206/234
(58) Field of Classification Search ............... 43/11, 12; 206/223, 234
See application file for complete search history.

(56) References Cited

U.S. PATENT DOCUMENTS

| 1,366,145 | A | * | 1/1921 | Wolf | 43/12 |
| 1,387,393 | A | * | 8/1921 | Hanel | 43/12 |
| 2,245,993 | A | * | 6/1941 | McCoy | 43/12 |
| 2,457,922 | A | * | 1/1949 | Robinson | 43/12 |
| 2,515,685 | A | * | 7/1950 | Ash | 43/12 |
| 2,595,597 | A | * | 5/1952 | Morseth | 285/302 |
| 3,579,890 | A | | 5/1971 | Maxwell | |
| 3,670,444 | A | | 6/1972 | Dieterich | |
| 4,619,065 | A | | 10/1986 | Jones | |
| D319,681 | S | | 9/1991 | Mengo | |
| 5,605,003 | A | * | 2/1997 | Krc et al. | 43/12 |
| 6,101,756 | A | * | 8/2000 | Baker | 43/12 |
| 6,408,560 | B1 | | 6/2002 | Bloom | |
| 7,124,533 | B2 | | 10/2006 | Kleckner | |
| 7,269,921 | B2 | * | 9/2007 | Lee | 43/12 |
| 2012/0036758 | A1 | * | 2/2012 | Steffens | 43/12 |

* cited by examiner

Primary Examiner — J. Gregory Pickett
Assistant Examiner — Blaine Neway (57) ABSTRACT A fishing net system featuring a telescopic handle, one or more rim components, and one or more net components. The handle is removably attached to the rim component via an attachment base. The rim component is constructed from a first semicircular arc and a second semicircular arc, wherein the arcs can connect together form a generally circular ring. Protrusions are disposed on the ends of the arcs, which are adapted to engage slots in the attachment base. The curvature of the first arc faced outwardly, and the second arc is adapted to rotate in its slot in the attachment base. An end attachment means temporarily secures the second end of the first arc to the second end of the second arc. The net component has a first half sleeve and a second half sleeve adapted to receive the first arc and the second arc, respectively.

20 Claims, 9 Drawing Sheets

FISHING NET SYSTEM

FIELD OF THE INVENTION

The present invention is directed to a net system for fishing, more particularly to a net system allowing the user to create various sizes of rims, poles, and nets.

BACKGROUND OF THE INVENTION

In order for fisherman to use various sizes of rims, poles, and nets, fishermen must purchase different items separately. This results in having to store and transport a great deal of equipment. The present invention features a fishing net system that allows fisherman to choose different size rims, poles, and net. The system of the present invention helps save space and money as all of a fisherman's needs may be combined in this once system Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a fishing net system. In some embodiments, the system comprises a handle constructed from at least an inner pole telescopically received in an outer pole, the handle has a first end and a second end and is adjustable in length; an attachment base having a first end and a second end, wherein a channel is disposed in the first end of the attachment base adapted to receive the first end of the handle, and a first slot and a second slot are each disposed in the second end of the attachment base; a first attachment means disposed in the attachment base for temporarily securing the first end of the handle in the channel of the attachment base; a rim component comprising a first arc and a second arc, the first arc and second arc both being generally semicircular, the first arc and second arc can connect together form a generally circular ring, wherein a first protrusion is disposed on a first end of the first arc and a second protrusion is disposed on a first end of the second arc, the first protrusion is adapted to snugly slide into the first slot disposed in the second end of the attachment base and the second protrusion is adapted to snugly slide into the second slot disposed in the second end of the attachment base, the first arc is adapted to be secured in a first position with the first protrusion engaged in the first slot of the attachment base, the first position corresponding to a curvature of the first arc facing outwardly, the second arc is adapted to rotate between at least a second position and a third position with the second protrusion engaged in the first slot of the attachment base, the second position corresponding to a curvature of the second arc is positioned in the same direction as the curvature of the first arc when the first arc is in the first position, and the third position corresponding to the curvature of the second arc facing outwardly opposite the curvature of the first arc when the first arc is in the first position; a first locking means for securing the first arc in the second position and a second locking means for securing the second arc in the third position an end attachment means for temporarily securing a second end of the first arc to a second end of the second arc; and a net component having a top edge, wherein a first half sleeve and a second half sleeve are each disposed along a portion of the top edge of the net component, the first half sleeve and the second half sleeve are adapted to receive the first arc and the second arc, respectively, the first half sleeve and the second half sleeve are separated by a first gap and a second gap.

In some embodiments, the system further comprises a hand grip disposed on the handle. In some embodiments, the first attachment means is a spring-loaded push button mechanism. In some embodiments, the first locking means is a first set screw. In some embodiments, the second locking means includes a locking pin disposed on the attachment base, the locking pin is adapted to engage a groove disposed on the second arc when the second arc is moved to the third position. In some embodiments, the end attachment includes a threaded male screw disposed on the second end of the first arc adapted to be threaded into a threaded female rim nut disposed on the second end of the second arc.

In some embodiments, the system further comprises a sliding cone disposed near a second end of the inner pole of the handle, the sliding cone is generally hollow, wherein internal threads are disposed on an inner surface of the sliding cone at a second end of the sliding cone; and a fixed cone disposed on a first end of the outer pole of the handle, wherein external threads are disposed on an outer surface of the fixed cone at a second end of the fixed cone, wherein the sliding cone is adapted to slide over the fixed cone when the inner pole is slid into the outer pole, the sliding cone can rotate in a first direction to engage the internal threads with the external threads to secure the outer pole and inner pole together, the sliding cone can rotate in a second direction to disengage the internal threads from the external threads to separate the outer pole and inner pole. In some embodiments, a plurality of protrusions are disposed on an inner surface of an inner cavity of the fixed cone and a plurality of indentations are disposed on an outer surface of the second end of the inner pole, the indentations and protrusions can engage to help secure the inner and outer pole together.

The present invention also features a kit comprising the fishing net system of the present invention and a carrying case with one or more compartments, the compartments being for storing the fishing net system.

DESCRIPTION OF PREFERRED EMBODIMENTS

Referring now to FIGS. 1-7, the present invention features a fishing net system 100 that allows fisherman to generate different sizes of rims, poles, and nets as desired. For example, the various sized nets and rims are interchangeable. All components are portable. The system 100 provides portable nets, rims, and telescopic poles that can be collapsed and carried in a convenient case. The nets ease fishing and straining.

The system 100 of the present invention comprises a handle 110 (with optional hand grip 118, see FIG. 5), a rim component, and a net component 310. The handle 110 connects to the rim component via an attachment base 150 disposed on (or removably attached to) the first end of the handle 110. The handle 110 may be adjustable in length.

Figure 1:
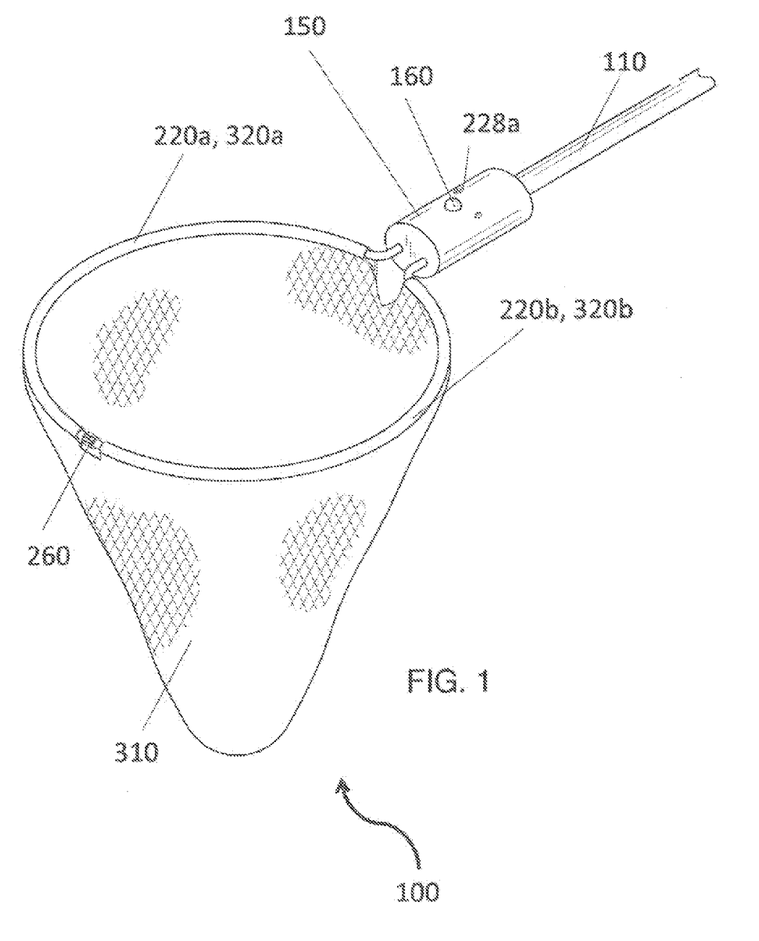
FIG. 1 is a perspective view of the fishing net system of the present invention.

For example, in some embodiments, the handle 110 is constructed from telescopic poles. Telescopic mechanisms and other mechanisms for allowing for length adjustment in a pole are well known to one of ordinary skill in the art. As shown in FIG. 1, the handle 110 comprises a first telescopic pole 110a (e.g., inner pole) telescopically received in a second telescopic pole 110b (e.g., outer pole). The first end of the first telescopic pole 110a may be attached to other components of the system of the present invention. Disposed near the second end of the first telescopic pole 110a is a sliding cone 111 (e.g., a portion of the second end of the first telescopic pole 110a protrudes past the sliding cone 111). The sliding cone 111 has a first end and a second end (and the sliding cone 111 may be generally hollow), wherein the first end has a diameter smaller than the diameter of the second end. Internal threads 112 may be disposed on the inner surface of the sliding cone 111 at the second end of the sliding cone 111. A fixed cone 114 may be disposed on the first end of the second telescopic pole 110b. The fixed cone 114 has a first end and a second end, wherein the first end has a diameter smaller than the diameter of the second end. The second end of the fixed cone 114 faces the second end of the second telescopic pole 110b. External threads 116 may be disposed on the outer surface of the fixed cone 114 at the second end. The sliding cone 111 is adapted to slide over the fixed cone 114 when the telescopic poles 110 are engaged (e.g., the second end of the first telescopic pole 110a slides through the generally hollow inner cavity of the fixed cone 114 so as to slide into the second telescopic pole 110b). The sliding cone 111 can rotate in a first direction to engage the threads 112, 116 (e.g., to secure the telescopic poles 110 together). The sliding cone 111 can rotate in a second direction do disengage the threads 112, 116 (e.g., to separate the telescopic poles 110). In some embodiments, a plurality of protrusions 119 are disposed on the inner surface of the inner cavity of the fixed cone 114 and a plurality of indentations 118 are disposed on the outer surface of the second end of the first telescopic pole 110a (or vice versa). The indentations 118 and protrusions 119 can engage to help secure the two telescopic poles 110 together. Without wishing to limit the present invention to any theory or mechanism, it is believed that the configuration of the handle 110 (e.g., with the sliding cone, fixed cone, protrusions, indentations, etc.) is advantageous because the configuration may provide a stronger handle.

In some embodiments, the handle 110 is constructed from an inner pole telescopically received in an outer pole. In some embodiments, the outer pole is between about 15 to 20 inches (e.g., 18 inches) in length as measured from the first end to the second end. In some embodiments, the outer pole is between about 20 to 30 inches (e.g., 25 inches) in length as measured from the first end to the second end. In some embodiments, the inner pole is between about 20 to 25 inches (e.g., 21 inches) in length as measured from the first end to the second end. In some embodiments, the inner pole is between about 25 to 30 inches (e.g., 28 inches) in length as measured from the first end to the second end. The handle 110 (e.g., inner pole, outer pole) is not limited to the aforementioned sizes. The handle (e.g., inner pole, outer pole) may be secured at a particular length via a securing mechanism (e.g., a lock, etc.). The handle 110 (e.g., inner pole, outer pole) may be coated for easy gripping.

Figure 3A:
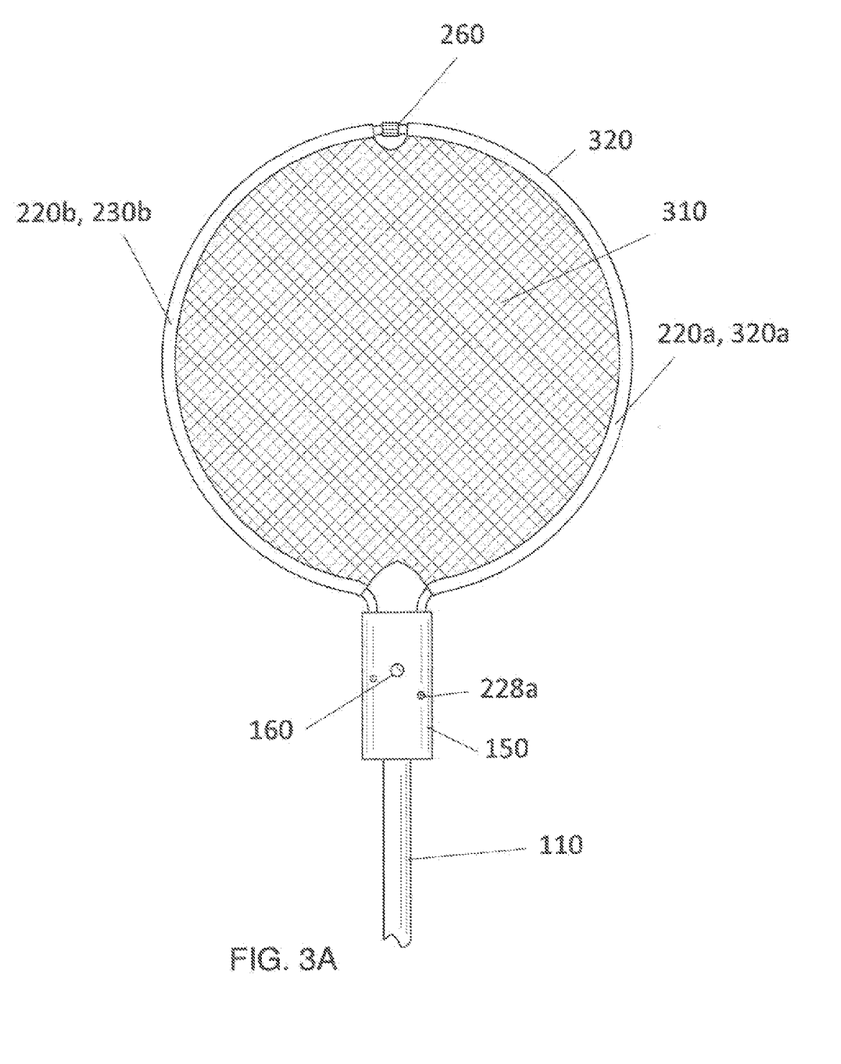
FIG. 3A is a top view of the fishing net system of FIG. 1, wherein the first arc and second arc are secured together to form a generally circular ring for the net.
Figure 3B:
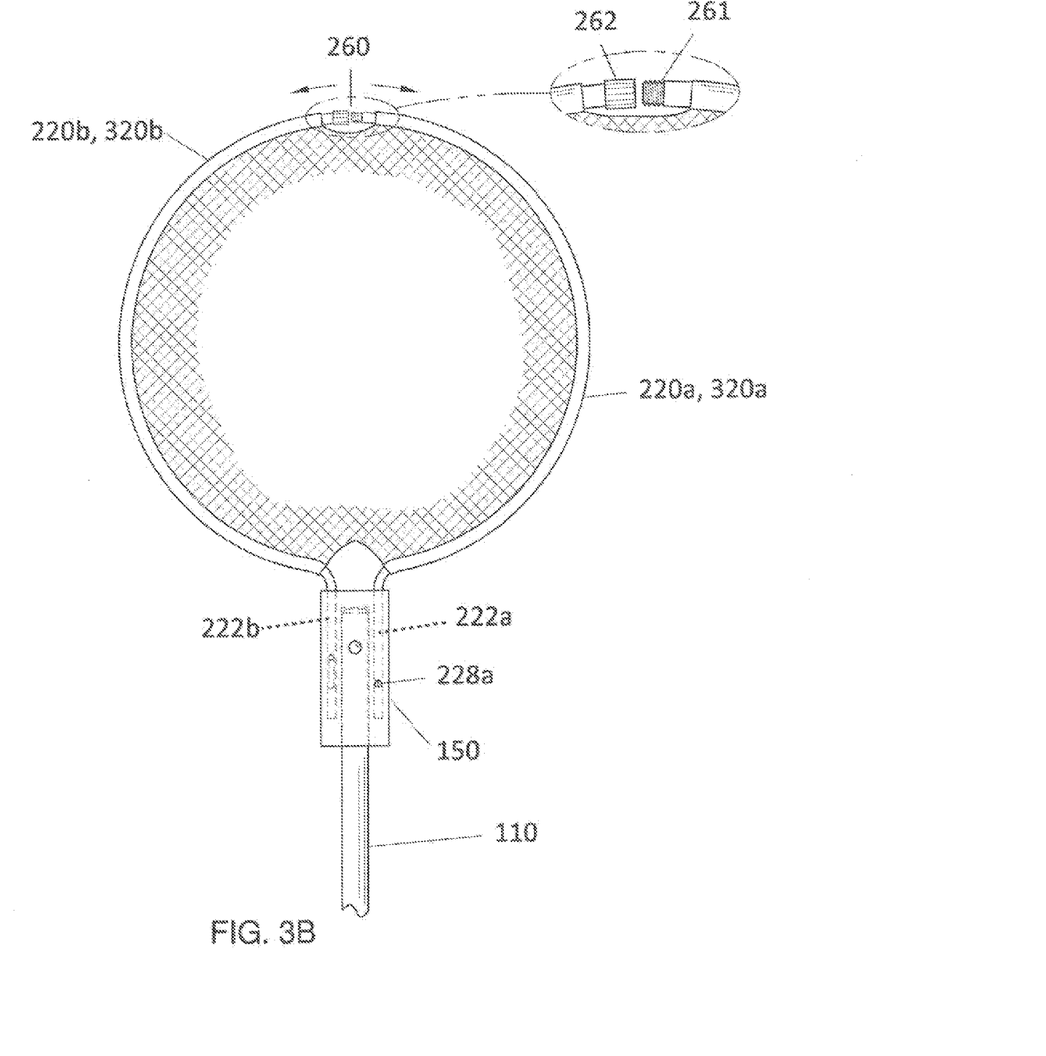
FIG. 3B is a top view of the fishing net system of FIG. 1, wherein the first arc and second arc are detached from each other (e.g., via the second attachment means).
Figure 3C:
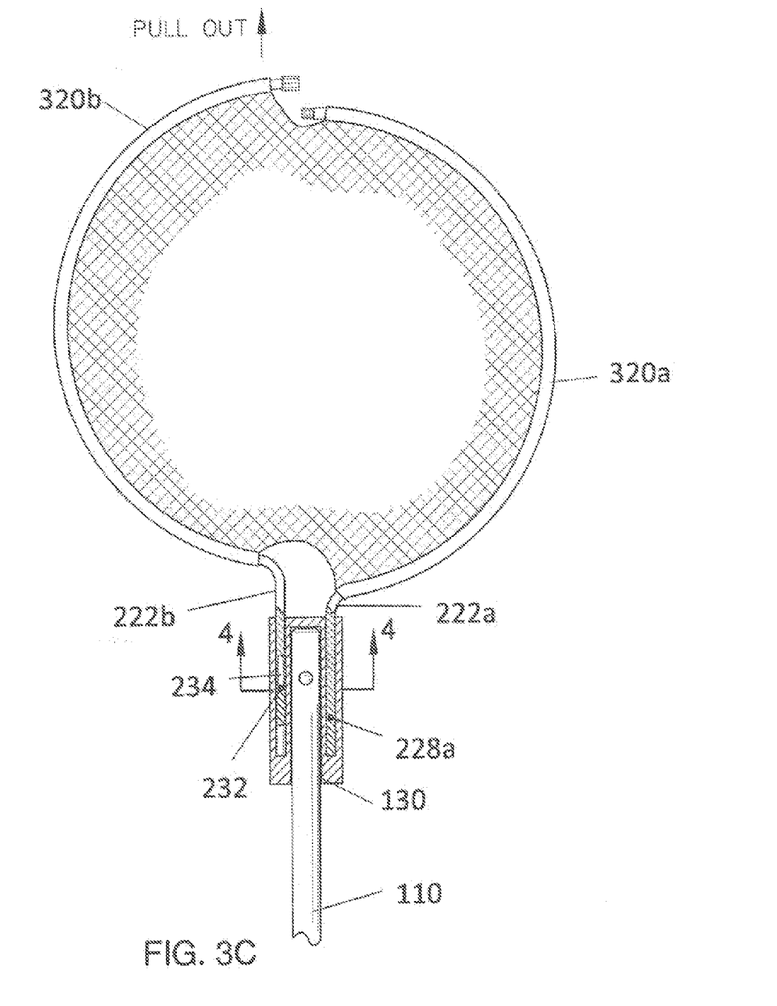
FIG. 3C is a top view of the fishing net system of FIG. 1, wherein the first arc and second arc are detached from each other and the second arc is being removed partially from the attachment base (e.g., the second arc is just pulled out 1 or 1.25 inches so the net can be attached).
Figure 4:
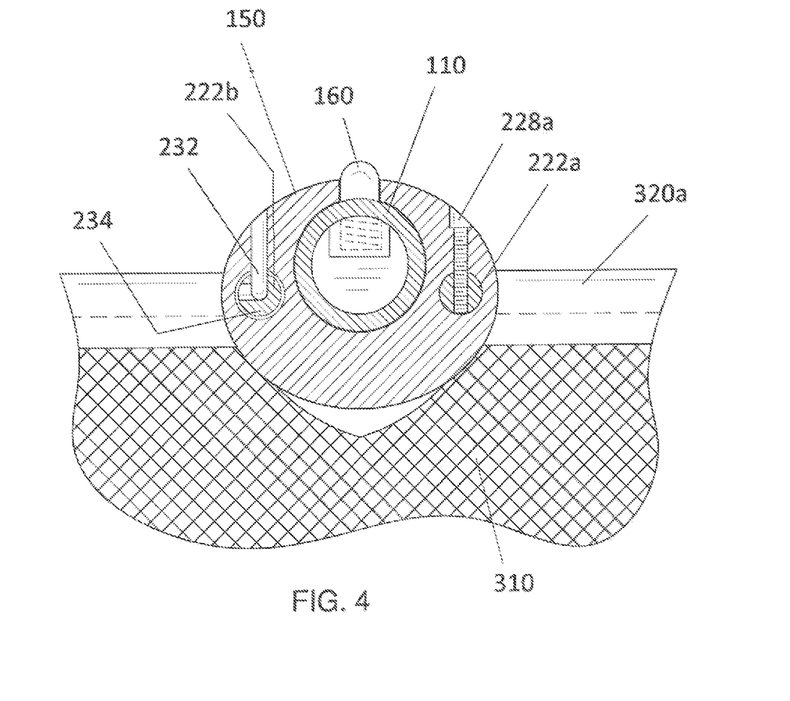
FIG. 4 is a side cross sectional view of the attachment base of the system of FIG. 3C.

The handle 110 may be inserted into a channel 130 disposed in the first end of the attachment base 150. The handle 110 may be removably attached in the attachment base 150, e.g., via a first attachment means 160 including but not limited to a pin and aperture mechanism, a snap mechanism, a clamp mechanism, a magnetic mechanism, etc.). FIG. 4 shows the first attachment means 160 as a spring-loaded push button. Spring-loaded push buttons are well known to one of ordinary skill in the art. FIG. 3C shows the handle 110 inserted into the channel 130 in the attachment base 150.

Figure 5:
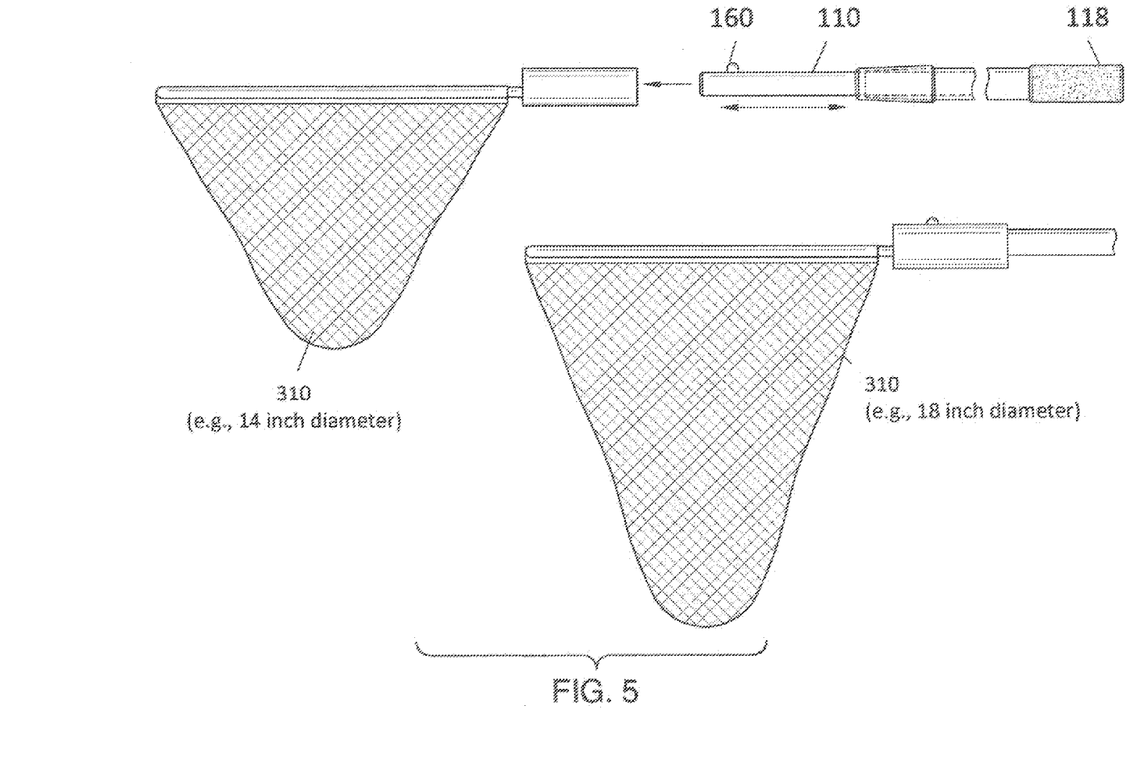
FIG. 5 is a side view of different sizes of fishing net systems of the present invention.

The rim component may be constructed in a variety of sizes. For example, in some embodiments, the rim is between about 10 to 15 inches'(e.g., 14 inches) in diameter. In some embodiments, the rim component is between about 15 to 20 inches (e.g., 18 inches) in diameter. FIG. 5 shows an example of systems 100 of the present invention with a 14-inch diameter rim component and an 18-inch diameter rim component.

The rim component comprises a first arc 220a and a second arc 220b, which connect together form a generally circular ring. For example each arc 220 is generally semi-circular in shape. The first end of the first arc 220a and the first end of the second arc 220b each have a protrusion 222 (e.g., a first protrusion 222a is disposed on the first end of the first arc 220a and a second protrusion 222b is disposed on the first end of the second arc 220b). The protrusions 222a, 222b are adapted to be inserted into the attachment base 150 disposed on the handle 110. For example, two slots (e.g., a first slot, a second slot) may be disposed in the attachment base 150, which are each adapted to snugly hold a protrusion 222a, 222b of an arcs 220a, 220b. FIG. 3B and FIG. 3C show the protrusions 222a, 222b inserted into the slots of the attachment base 150.

Figure 6:
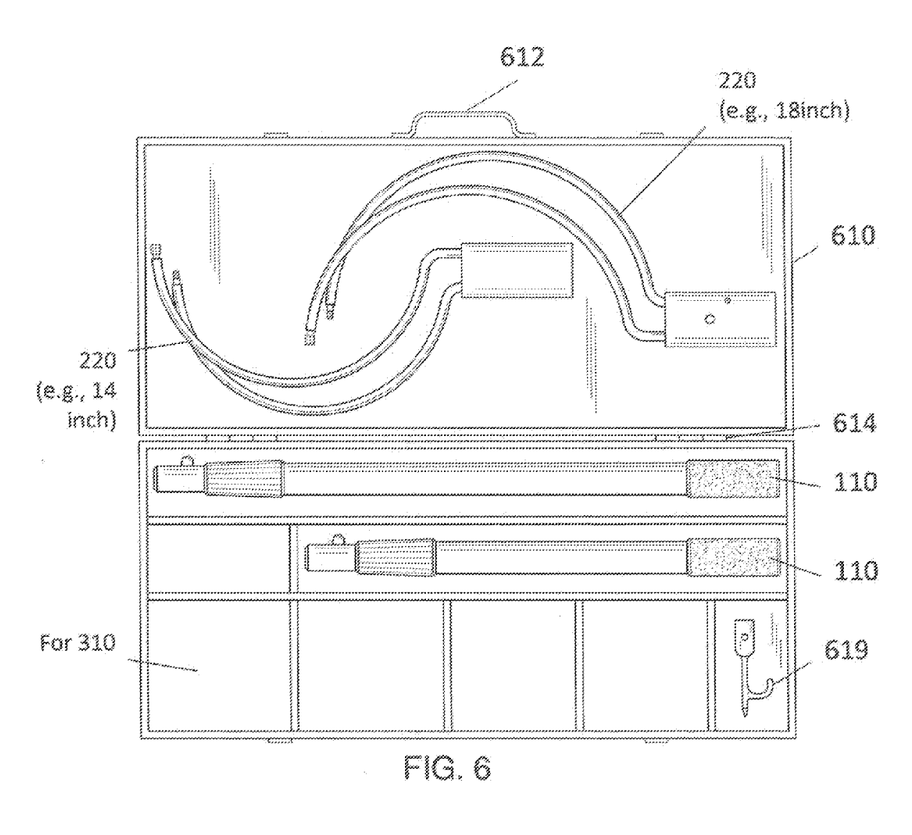
FIG. 6 is a top view of the system of the present invention as stored in a carrying case.
Figure 7:
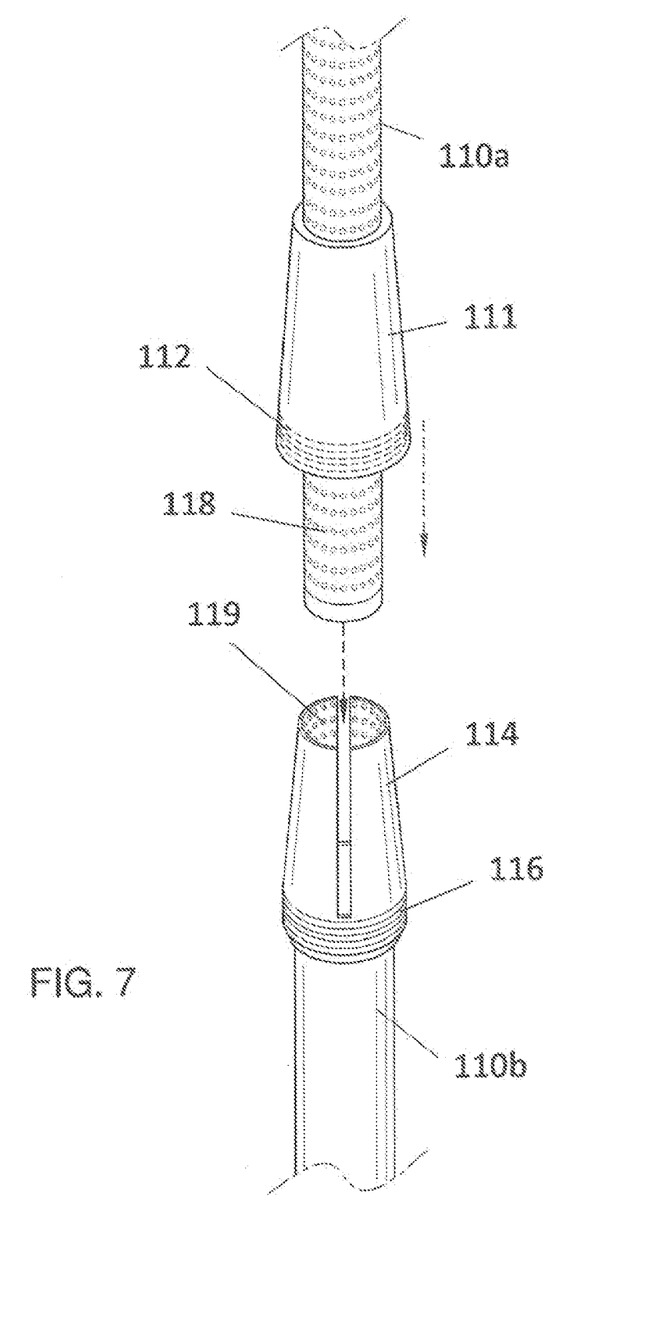
FIG. 7 is an exploded view of the telescopic poles of the handle of the system of the present invention.

In some embodiments, the arcs 220a, 220b can rotate between multiple positions within the slots in the attachment base 150 (see FIG. 2), for example between about 0 to 180 degrees. Or, in some embodiments, the first arc 220a is stationary (e.g., in a first position wherein the curvature of the first arc 220a faces outwardly, see FIG. 1, FIG. 2, etc.) and the second arc 220b can rotate between multiple positions in the slot of the attachment base 150 (e.g., between about 0 to 180 degrees). For example, the second arc 220b can rotate between a second position wherein the curvature of the second arc 220b is positioned in the same direction as the first arc 220a (e.g., see FIG. 2) and a third position wherein the curvature of the second arc 220b is faces outwardly (e.g., see FIG. 1, FIG. 3A, FIG. 3B, FIG. 3C) The rotation of the arc 220b (e.g., both arcs 220a, 220b or the second arc 220b) can allow for convenient storage of the system 100 of the present invention (more compact configuration, collapsed configuration, etc.), and/or the rotation of the arcs may allow for easy attachment of the net component 310. For example, see FIG. 6 showing the arcs stored in a carrying case 610.

As shown in FIG. 3C and FIG. 4, the first arc 220*a* is a stationary arc, which is secured in the first slot in the attachment base 150 via a first locking means, for example a first set screw 228*a*. The present invention is not limited to immobilizing the first arc 220*a* with a first set screw 228*a*. As shown in FIG. 4, the second arc 220*b* (e.g., the rotating arc) can be secured in a particular position via a second locking means. For example, in some embodiments, the second locking means may include but is not limited to a locking pin mechanism wherein a locking pin 232 is disposed on the attachment base 150 and a groove 234 is disposed on the protrusion 222*b* of the second arc 220*b*. The locking pin 232 can engage the groove 234 when the second arc 220*b* is moved from the second position (see FIG. 2) to the third position (see FIG. 3C).

The second ends of each of the arcs 220 are adapted to engage each other via an end attachment means 260. The end attachment 260 means may include but is not limited to a screw mechanism, a magnetic mechanism, a snap mechanism, a clamp mechanism, the like, or a combination thereof. FIG. 3B shows the end attachment means 260 comprising a threaded male screw 261 (e.g., peg) disposed on the second end of the first arc 220*a* adapted to be threaded into a threaded female rim nut 262 (e.g., channel) disposed on the second end of the second arc 220*b*. The end attachment means 260 is not limited to a peg and channel (e.g., threaded screw and threaded nut) mechanism.

FIG. 3C is a top view of the fishing net system 100, wherein the first arc 220*a* and second arc 220*b* are detached from each other. The second arc 220*b* is being partially removed from the attachment base, for example the second arc 220*b* is pulled about between about 1 to 1.25 inches from the attachment base 150 so that a net 310 can be threaded on.

The system of the present invention further comprises a net component 310 (e.g., a standard fishing net) for attaching to the rim component (the arcs 220*a*, 220*b*). The net component 310 has net sleeves 320 disposed along a portion of the top edge. The sleeves 320 are adapted to allow the net component 310 to easily slide onto the rim component (e.g., slide over the first arc 220*a* and second arc 220*b*). As shown in FIG. 3C, the net component comprises a first half sleeve 320*a* adapted to slide over the first arc 220*a* and a second half sleeve 320*b* adapted to slide over the second arc 220*b*. The sleeves 320 do not connect. In some embodiments, a fastener is disposed on the net component 310 to allow the net to be secured to the rim component.

Figure 2:
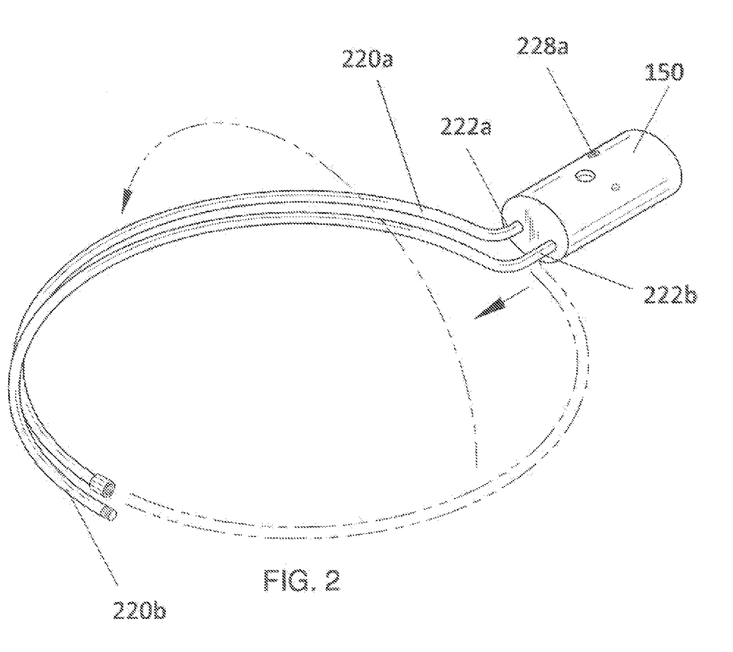
FIG. 2 is a detailed view of the arcs of the system of the present invention.

To attach the net component 310, in some embodiments, the first arc 220*a* is secured in the first position and the second arc 220*b* is moved to the second position (e.g., see FIG. 2, wherein both arcs 220 face the same direction). The first half sleeve 320*a* is slid onto the first arc 220*a* and the second half sleeve 320*b* is slid onto the second arc 220*b*. With the net component 310 attached, the second arc 220*b* can be rotated to the third position (and secured via the second locking mechanism). Then, the second ends of the arcs 220 can be secured together via the end attachment means 260.

The first half sleeve 320*a* and the second half sleeve 320*b* are separated by a first gap and a second gap, wherein the first gap accommodates the end attachment means and the second gap accommodates the first protrusion and the second protrusion.

The net component 310 may be constructed from a variety of materials, for example the net component 310 may be constructed in a "mesh net" style or a "straining net" style. The net component 310 may be constructed in a variety of sizes to accommodate the users needs. For example, in some embodiments, the net component 310 is about 25 inches in depth (e.g., from the top edge to the bottom). In some embodiments, the net component 310 is about 20 inches in depth (e.g., from the top edge to the bottom). In some embodiments, the net component 310 is about 15 inches in depth (e.g., from the top edge to the bottom). The net component 310 is not limited to the aforementioned sizes.

The system 100 of the present invention may further comprise a hook. The hook may be attachable to the handle 110 (e.g., inner pole, outer pole). The hook may be constructed in a variety of sizes. For example, in some embodiments, the hook is about 4 inches in length. The hook is in no way limited to the aforementioned dimension.

Referring now to FIG. 6, the system 100 of the present invention may further comprise a carrying case 610 for carrying the components of the system 100, for example the handle 110 (e.g., the telescopic poles), various size net components 310 and/or various sized rim components, etc. In some embodiments, the carrying case 610 comprises a plurality of separate compartments for storing the various items separately. The carrying case 610 may be constructed in a variety of shapes, sizes, and configurations. For example, in some embodiments, the carrying case 610 is about 30 inches long, about 12 inches wide, and about 4 inches thick, however the carrying case is in no way limited to the aforementioned dimensions.

As shown in FIG. 6, the carrying case 610 may be foldable (e.g., via a hinge 614). In some embodiments, the carrying case 610 is canvas. In some embodiments, the carrying case 610 can be carried like a backpack (e.g., with straps) or with a handle 612. One or more compartments may be used to store the arcs 220. One or more compartments may be used to store the nets 310. One or more compartments may be used to store the handle 110 (e.g., the telescopic poles 110*a*, 110*b*). One or more compartments may be used to store hooks 619.

In some embodiments, the present invention features a kit comprising the carrying case 610 and one or more components of the system 100 of the present invention.

The disclosures of the following U.S. patents are incorporated in their entirety by reference herein: U.S. Pat. No. 3,579, 890; U.S. Pat. No. 3,670,444; U.S. Pat. No. 7,124,533; U.S. Pat. No. 6,408,560; U.S. Pat. No. 4,619,065.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fishing net system comprising:
   (a) a handle constructed from at least an inner pole telescopically received in an outer pole, the handle has a first end and a second end and is adjustable in length;
   (b) a one piece attachment base having a first end and a second end, wherein a channel is disposed in the first end of the attachment base adapted to receive the first end of the handle, and a first slot and a second slot are each disposed in the second end of the attachment base;
   (c) a first attachment means disposed in the attachment base for temporarily securing the first end of the handle in the channel of the attachment base;

(d) a rim component comprising a first arc and a second arc, the first arc and second arc both being generally semicircular, the first arc and second arc can connect together to form a generally circular ring, wherein a first protrusion is disposed on a first end of the first arc and a second protrusion is disposed on a first end of the second arc, the first protrusion is adapted to snugly slide into the first slot disposed in the second end of the attachment base and the second protrusion is adapted to snugly slide into the second slot disposed in the second end of the attachment base, the first arc is adapted to be secured in a first position with the first protrusion engaged in the first slot of the attachment base, the first position corresponding to a curvature of the first arc facing outwardly, the second arc is adapted to rotate between at least a second position and a third position with the second protrusion engaged in the first slot of the attachment base, the second position corresponding to a curvature of the second arc positioned in the same direction as the curvature of the first arc when the first arc is in the first position, and the third position corresponding to the curvature of the second arc facing outwardly opposite the curvature of the first arc when the first arc is in the first position;

(e) a first locking means for securing the first arc in the first position and a second locking means for securing the second arc in the third position;

(f) an end attachment means for temporarily securing a second end of the first arc to a second end of the second arc; and (g) a net component having a top edge, wherein a first half sleeve and a second half sleeve are each disposed along a portion of the top edge of the net component, the first half sleeve and the second half sleeve are adapted to receive the first arc and the second arc, respectively, the first half sleeve and the second half sleeve are separated by a first gap and a second gap.

2. The system of claim 1 further comprising a hand grip disposed on the handle.

3. The system of claim 1, wherein the outer pole is between about 15 to 20 inches in length as measured from a first end to a second end.

4. The system of claim 1, wherein the outer pole is between about 20 to 30 inches in length as measured from a first end to a second end.

5. The system of claim 1, wherein the inner pole is between about 20 to 25 inches in length as measured from a first end to a second end.

6. The system of claim 1, wherein the inner pole is between about 25 to 30 inches in length as measured from a first end to a second end.

7. The system of claim 1 further comprising: (a) a sliding cone disposed near a second end of the inner pole of the handle, the sliding cone is generally hollow, wherein internal threads are disposed on an inner surface of the sliding cone at a second end of the sliding cone; and (b) a fixed cone disposed on a first end of the outer pole of the handle, wherein external threads are disposed on an outer surface of the fixed cone at a second end of the fixed cone, wherein the sliding cone is adapted to slide over the fixed cone when the inner pole is slid into the outer pole, the sliding cone can rotate in a first direction to engage the internal threads with the external threads to secure the outer pole and inner pole together, the sliding cone can rotate in a second direction to disengage the internal threads from the external threads to separate the outer pole and inner pole.

8. The system of claim 7, wherein a plurality of protrusions are disposed on an inner surface of an inner cavity of the fixed cone and a plurality of indentations are disposed on an outer surface of the second end of the inner pole, the indentations and protrusions can engage to help secure the inner and outer pole together.

9. The system of claim 1, wherein the first attachment means is a spring-loaded push button mechanism.

10. The system of claim 1, wherein the first locking means is a first set screw.

11. The system of claim 1, wherein the second locking means includes a locking pin disposed in the attachment base, the locking pin is adapted to engage a groove disposed on the second arc when the second arc is moved to the third position.

12. The system of claim 1, wherein the end attachment includes a threaded male screw disposed on the second end of the first arc adapted to be threaded into a threaded female rim nut disposed on the second end of the second arc.

13. A kit comprising:
(a) a fishing net system comprising:
(i) a handle constructed from at least an inner pole telescopically received in an outer pole, the handle has a first end and a second end and is adjustable in length;
(ii) a one piece attachment base having a first end and a second end, wherein a channel is disposed in the first end of the attachment base adapted to receive the first end of the handle, and a first slot and a second slot are each disposed in the second end of the attachment base;
(iii) a first attachment means disposed in the attachment base for temporarily securing the first end of the handle in the channel of the attachment base;
(iv) a rim component comprising a first arc and a second arc, the first arc and second arc both being generally semicircular, the first arc and second arc can connect together to form a generally circular ring, wherein a first protrusion is disposed on a first end of the first arc and a second protrusion is disposed on a first end of the second arc, the first protrusion is adapted to snugly slide into the first slot disposed in the second end of the attachment base and the second protrusion is adapted to snugly slide into the second slot disposed in the second end of the attachment base, the first arc is adapted to be secured in a first position with the first protrusion engaged in the first slot of the attachment base, the first position corresponding to a curvature of the first arc facing outwardly, the second arc is adapted to rotate between at least a second position and a third position with the second protrusion engaged in the first slot of the attachment base, the second position corresponding to a curvature of the second arc positioned in the same direction as the curvature of the first arc when the first arc is in the first position, and the third position corresponding to the curvature of the second arc facing outwardly opposite the curvature of the first arc when the first arc is in the first position;
(v) a first locking means for securing the first arc in the first position and a second locking means for securing the second arc in the third position
(vi) an end attachment means for temporarily securing a second end of the first arc to a second end of the second arc; and
(vii) a net component having a top edge, wherein a first half sleeve and a second half sleeve are each disposed along a portion of the top edge of the net component, the first half sleeve and the second half sleeve are adapted to receive the first arc and the second arc, respectively, the first half sleeve and the second half sleeve are separated by a first gap and a second gap; and (b) a carrying case with one or more compartments, the one or more compartments being for storing the fishing net system.

14. The kit of claim 13, wherein a hand grip is disposed on the handle.

15. The kit of claim 13, wherein the fishing net system further comprises: (a) a sliding cone disposed near a second end of the inner pole of the handle, the sliding cone is generally hollow, wherein internal threads are disposed on an inner surface of the sliding cone at a second end of the sliding cone; and (b) a fixed cone disposed on a first end of the outer pole of the handle, wherein external threads are disposed on an outer surface of the fixed cone at a second end of the fixed cone, wherein the sliding cone is adapted to slide over the fixed cone when the inner pole is slid into the outer pole, the sliding cone can rotate in a first direction to engage the internal threads with the external threads to secure the outer pole and inner pole together, the sliding cone can rotate in a second direction to disengage the internal threads from the external threads to separate the outer pole and inner pole.

16. The kit of claim 15, wherein a plurality of protrusions are disposed on an inner surface of an inner cavity of the fixed cone and a plurality of indentations are disposed on an outer surface of the second end of the inner pole, the indentations and protrusions can engage to help secure the inner and outer pole together.

17. The kit of claim 13, wherein the first attachment means is a spring-loaded push button mechanism.

18. The kit of claim 13, wherein the first locking means is a first set screw.

19. The kit of claim 13, wherein the second locking means includes a locking pin disposed in the attachment base, the locking pin is adapted to engage a groove disposed on the second arc when the second arc is moved to the third position.

20. The kit of claim 13, wherein the end attachment includes a threaded male screw disposed on the second end of the first arc adapted to be threaded into a threaded female rim nut disposed on the second end of the second arc.

* * * * *